Figure 1:
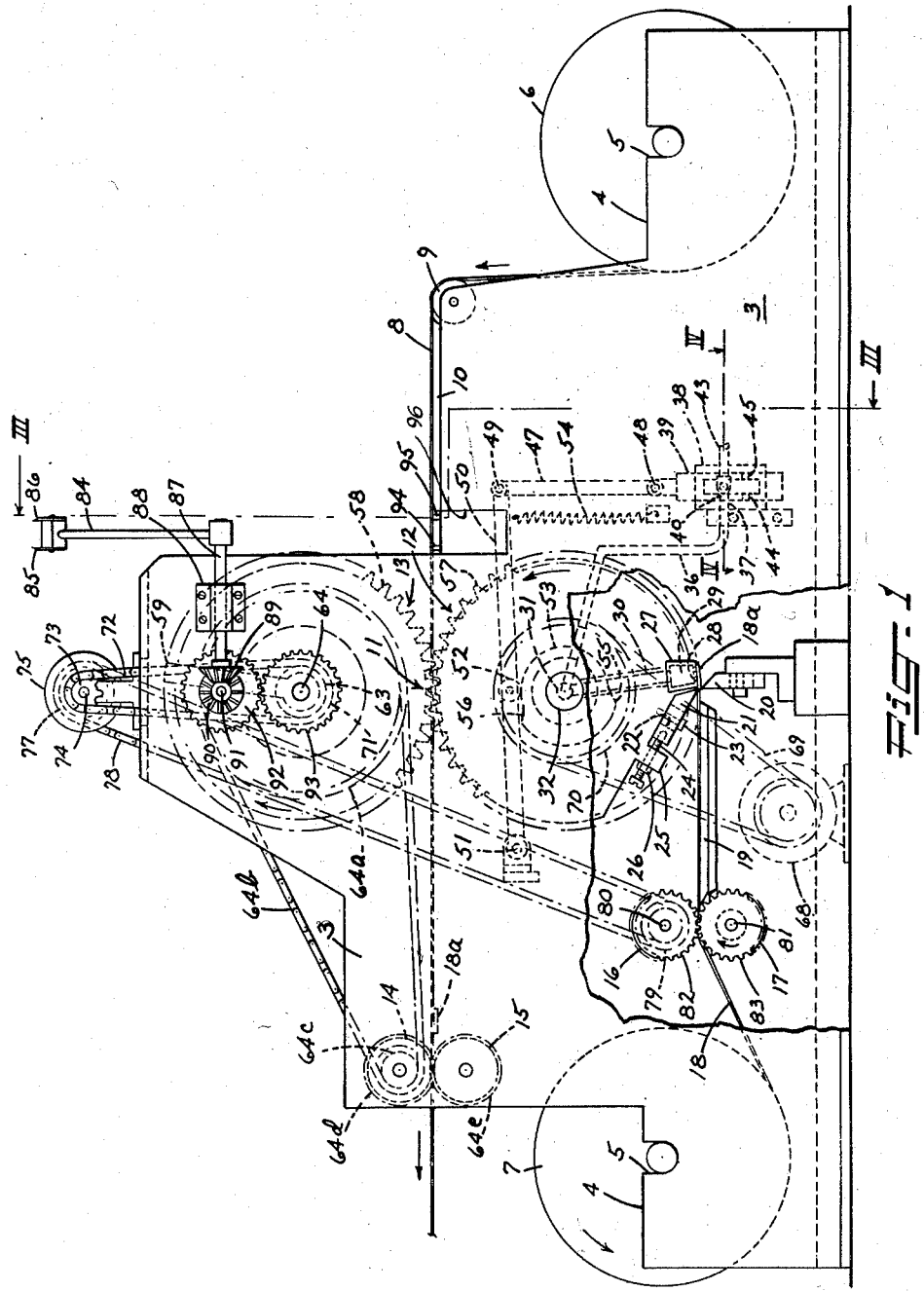

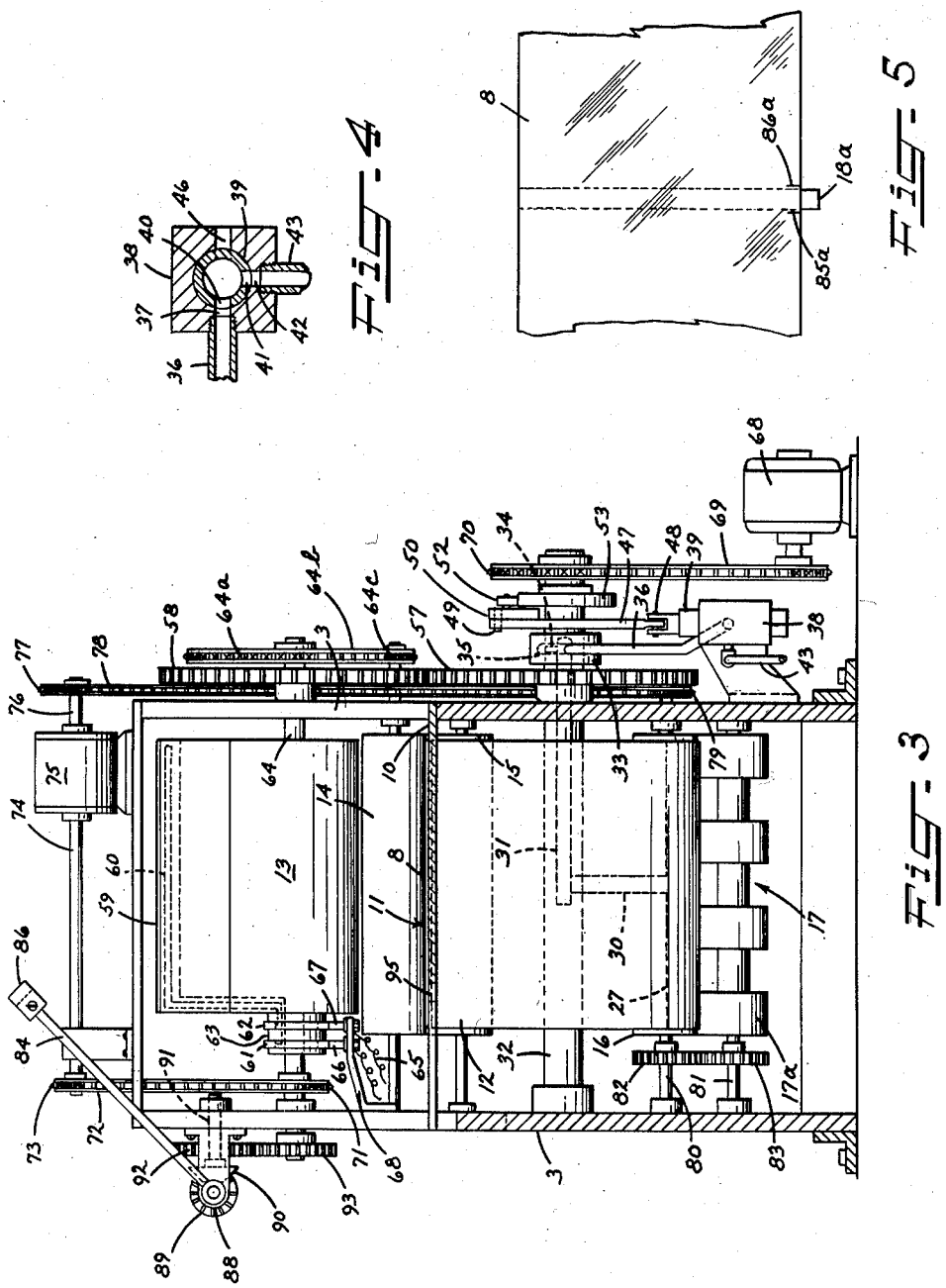

2,768,561
Patented Oct. 30, 1956

2,768,561

MACHINES FOR PRODUCING A COMPOSITE SHEET MATERIAL

Agostino Clemente, Elkins Park, and Peter D'Ippolito, Philadelphia, Pa.

Application July 16, 1953, Serial No. 368,424

3 Claims. (Cl. 93—1)

This invention is concerned with machines for producing a composite sheet material, and more particularly for applying tapes transversely to the longitudinal direction of a longitudinally traveling sheet or web. More particularly, it relates to machines which are adapted to apply narrow tear tapes, such as of cellophane, at intervals transversely of a running sheet or web which may also be of cellophane but may be of any other material, such as paper, cloth or non-fibrous films of plastic materials other than regenerated cellulose.

It is an object of the present invention to provide machines of the type hereinabove mentioned which have rotary means for simultaneously cutting off a leading edge of a material which may serve as a tear strip or tape and for transferring the cut edge from the position of cutting immediately to a position of sealing upon the continuously traveling web. Another object is to provide machines of this type for heat-sealing a tear tape to the main web or wrapper sheet in which the heat-sealing device is disposed above the path of travel of the main wrapper sheet or web as well as above the path of travel of the material from which the tear strip or tape is formed so that the heat is applied locally at the point of sealing but does not affect the supply of heat-sealing material whether such material is the tape itself or the wrapper sheet as such material proceeds to the sealing position. A further object of the invention is to provide in such machines a rotary transfer device having fluid-holding means adapted to seize the tape, such as by the application of vacuum, at the position of cutting and adapted to release the tape at or immediately adjacent to the position of sealing, such as by release of the vacuum so as to set-up fluid currents which tend to cool the holding or seizing support in preparation for its receiving the next tape whereby such support which also serves as a pressure anvil during the sealing of the tape to the web does not accumulate heat and rise in temperature to such an extent as to render any thermoplastic coating carried on the tape sticky and adhesive in character. Another object is to provide machines of this type which are particularly adapted to the sealing of a tape which may carry a thermoplastic layer thereon to a sheet, which may not be provided with a thermoplastic layer or may be provided with a coating of thermoplastic adhesive material on one face thereof, and in which a heated pressure element is brought to bear upon the uncoated face, that is, the face which does not carry an adhesive, of the sheet or web to the other face of which the tape is to be sealed or adhered. Another object of the invention is to provide a machine, adapted to operate continuously at high speed, for applying narrow tapes, such as tear tapes, at intervals to a continuously traveling web or sheet of wrapping material in which the wrapping material is supplied to the machine in the form of a continuous roll of indefinite length from which the web or sheet passes directly over a position or station in which a tear strip is brought from a station in which the tear strip is cut off a continuous roll thereof upwardly to the underside of the traveling web whereupon a heated pressure member is applied above the web and an unheated pressure member is applied in opposition thereto beneath the tear strip. Other objects and advantages of the invention will be apparent from the drawing and description thereof hereinafter.

Figure 2:
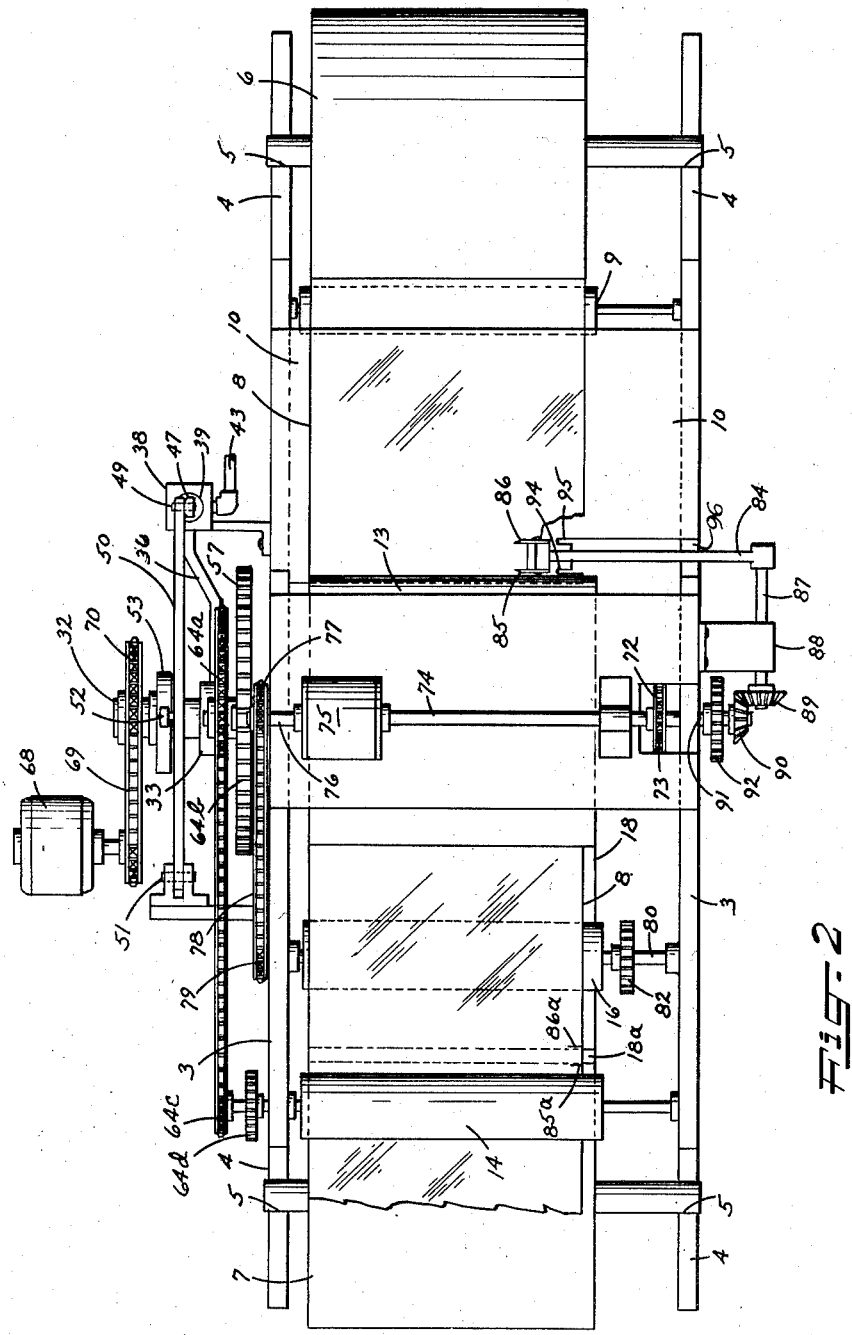

In the drawing, which is illustrative of the present invention,

Figure 1 is a side elevation of a preferred embodiment with one of the side plates of the frame partially broken away to facilitate illustration, Figure 2 is a plan view, Figure 3 is a view taken along line III—III in Figure 1, Figure 4 is a section taken on line IV—IV of Figure 1, and Figure 5 is a face view of the composite sheet obtained from the machine of the present invention.

The machine comprises any suitable frame such as one comprising a pair of vertically upright plates 3 which may be suitably secured together by tie bolts or the like. The frame may be supported on any suitable stand or bed, such as the frame of a packaging machine adapted to receive the prepared sheet material from the machine of this invention. Adjacent the lower portion of the side frames, extensions 4 may project from each end. Such extensions are notched as at 5 to receive the shaft or trunnions of a wound package of sheet material. The wound package at 6 is of the sheet or web which is intended to form the main sheet and to which is to be applied at spaced intervals therealong narrow tapes which are derived from the wound roll 7.

The sheet or web 8 proceeds from the supply 6 over a guide means carried by the frame at an upper level of the machine comprising an idling guide roll 9 and a fixed guiding plate 10 and then past the sealing position 11 between the rotary sealing devices carried on the rotary members 12 and 13 respectively. The sheet 8 may be drawn through this path by means of a pair of positively driven nip rolls 14 and 15 which may be mounted on the side frames 3 or, if suitable feed means are already present on the packaging or wrapping machine with which the present machine is to be associated, rolls 14 and 15 may be omitted and the prepared sheet may proceed directly to the feed rolls of the packaging or wrapping machine. The feed rolls 14 and 15 may be driven from any other element of the machine such as from the shaft which carries the rotary element 13, the peripheral speed of rolls 14 and 15 being preferably the same as the linear velocity of the elements carried on rotary devices 12 and 13 which contact the sheet.

A pair of feed or delivery rolls 16 and 17 draw the material 18 from the roll 7 and feed such material over guide means carried by the frame at a lower level comprising a fixed guide plate 19 and then to a cutting station provided with a stationary knife 20 positioned so as to cooperate with the knife 21 carried on the rotary member 12 for cutting off the leading end 18a of the material 18. The knife 21 is preferably adjustably mounted on the rotary member 12, being provided with slots 22 through which bolts 23 may extend to be secured into the body of the rotary member 12. Adjusting screws 24 have threaded engagement within the rib or strip 25 of the rotary member and may be fixed or set in adjusted position with the lock nut 26. The nip rolls 16 and 17 are driven at a relatively slow speed as compared to the traveling sheet 8 so as to supply to the cutting position a narrow width of the material 18 during the time that a full length of a wrapper is carried through the sealing position.

Holding means is provided on the rotor 12 for seizing the projecting edge 18a of material 18. For this purpose, a suction shoe or pressure element 27 is embedded or recessed within the rotor 12 so that its outer face is closely adjacent the leading edge of the knife 21. The outer face of this pressure element 27 is provided with a plurality of perforations 28 which communicate with an interior chamber 29 which in turn is connected by a suitable conduit 30 to the hollow bore 31 of the shaft 32 upon which the rotary member 12 is fixedly mounted for rotation therewith. The hollow chamber 31 within the shaft 32 is connected to suitable valve means through the stationary collar 33 within which the shaft 32 rotates. The chamber 31 (Figure 3) is connected with one or more radial passages 34 through shaft 32 which communicate with an annular channel or groove 35 formed within the collar 33. A conduit 36 connected at one end to collar 33 communicates with the groove 35 and with one port 37 (Figure 4) of a stationary valve casing or housing 38. Within the housing 38, a hollow piston or plunger 39 is reciprocated. This piston is closed at its ends and is provided with four ports. Two of these ports 40 and 41 are disposed in the same horizontal plane but are spaced apart circumferentially about the wall of the piston about 90° so that in the position shown, the port 41 communicates with a port 42 in the housing 38 and this port 42 is connected by a pipe or conduit 43 to a suction pump or other source of suction. At a lower-level of the piston, it is provided with a pair of ports 44 and 45 (Figure 1) which are disposed diametrically opposite each other so that when the piston 39 is elevated, the port 44 comes into registry with port 37 in housing 38 and port 45 comes into registry with a port 46 in the side wall of the housing 38 diametrically opposite port 37 whereby the interior of chamber 29 is connected to the atmosphere and the suction is released.

The sliding of piston 39 is effected by the linkage comprising the link 47 pivotally connected at 48 to the piston and at 49 to a lever 50 which is pivoted on a fulcrum 51 and carries a follower roll 52 which is urged against a cam 53 by a spring 54. The cam 53 is fixed upon shaft 32 so that it rotates therewith. The cam is provided with a rise 55 (Figure 1) which elevates the piston 39 when the shoe 27 is passing through the sealing position as will be explained more particularly hereinafter so that at this point, the vacuum is released. The dwell 56 of the cam is so positioned as to lower piston 39 whereby to apply suction to the shoe 27 at or somewhat before it reaches the position shown in Figure 1.

The sealing rotor 13 is driven in synchronism with the rotor 12, such as by gears 57 and 58 fixed on their respective shafts 64 and 32. This rotor is provided with a heated pressure shoe 59 which comes into juxtaposition with respect to the shoe 27 and presses the web and tape therebetween. The heating element 60 (Figure 3) within the shoe 59 derives electrical energy through a pair of conductive rings 61 and 62 supported on an insulating collar 63 fixed to the shaft 64 upon which the rotor 13 is mounted for rotation. The leads 65 from a suitable source of electric current are connected to a pair of terminals 66 and 67 supported on a bracket 68. The terminals 66 and 67 comprise conductive spring contacting elements which ride upon the rings 61 and 62 during rotation of the rotor 13.

The driving system comprises the following connections. A source of power, such as an electric motor 68 is connected by a belt or chain 69 to a pulley or sprocket 70 secured to shaft 32. Thus, the motor 68 directly drives the shaft 32 and the rotor 12 mounted thereon. The rotor 13 is driven from this shaft through the gears 57 and 58 respectively. The shaft 64 which rotates with rotor 13 mounted thereon carries a sprocket 71 through which a chain 72 drives a sprocket 73 and a shaft 74 to which the sprocket is fixed. The shaft 74 is connected to a speed-reducing device shown diagrammatically at 75, the output shaft of which is indicated at 76 and carries a sprocket 77 which drives the chain 78 and a sprocket 79 on shaft 80 carrying the feed roll 16. The lower feed roll 17 may be composed of a plurality of spaced rubber covered elements 17a (see Figure 3) fixedly secured on shaft 81. Feed roll 17 is driven through gears 82 and 83 fixedly secured on shafts 80 and 81 respectively.

A sprocket 64a is fixedly secured to shaft 64 and through the chain 64b drives a sprocket 64c on the shaft of roll 14. Gears 64d and 64e on the shafts of the rolls 14 and 15 drive roll 15.

Means is provided for nicking the edge of the main web adjacent the opposite sides of the narrow area upon which the tape is to be adhered. The mechanism for accomplishing this comprises the rotating arm 84, the terminus of which is provided with spaced thin cutting blades 85 and 86 respectively. This arm is fixedly mounted on a shaft 87 supported in a bearing or bearings 88 and carrying a bevel gear 89 by which it may be driven from a bevel gear 90 fixedly mounted on a shaft 91 which has fixedly secured thereon a gear 92 which in turn is in mesh with a gear 93 fixed on shaft 64. The guide plate 10 is suitably slotted at 94 and 95 respectively to allow the blades 85 and 86 to pass therethrough. The adjacent side frame 3 is also cut away as at 96 to allow free rotation of the swinging arm 84 and its associated cutters.

In operation, the main web is drawn over the idling guide roll 9 and adjacent guide plate 10 located at an upper level between the frames 3 by means of suitable drawing means, such as the delivery rolls 14 and 15 mentioned hereinabove. This passage of the main sheet 8 is continuous and at constant linear speed. The feed rolls 16 and 17 disposed at a lower level in the machine are driven at a lower peripheral speed than the rolls 14 and 15 and draw the sheet 18 from the supply 7 and feed such sheet over the lower-level guide means 19 to the cutting position where during each revolution of the rotor 12, a short length is caused to protrude past the stationary cutting element 20. As the cutting element 21 carried on the rotor 12 reaches the cutting element 20 and cuts the protruding portion 18a, such protruding portion is held by the suction shoe 27. The continued rotation of rotor 12 carries the cut tape 18a from the cutting position upwardly under the sheet 8 and in tangential relation thereto. Rotor 13 is so synchronized with the rotor 12 that the heated element 59 comes into contact with the upper face of sheet 8 at the same time that the tape 18a is brought into contact therebeneath. Heated element or shoe 59 and the suction shoe 27 press the tape and sheet together. At the same time, the shoe 59 heats the two and causes them to adhere by virtue of a heat-sealing coating which may be either on the under face of sheet 8 or on the upper face of the tear strip 18a. Of course, the heat-sealing coating may be present on both such faces and it may be present on both faces of the tape 18a and/or on both faces of the sheet 8 though it is preferable not to have it on the upper face of sheet 8 where there might be a tendency for it to stick to the heated shoe 59. As the main sheet 8 proceeds towards the sealing position 11, the blades 85 and 86 are swung through the slots 94 and 95, cutting slits into the edge of the sheet 8 which extend a short distance inwardly from the edges such as ⅛ to ¼ of an inch or more. The cutting by blades 85 and 86 is so synchronized that the two slits thus made in the edge of the sheet 8 are disposed one on each side of the tear tape when it is applied in the sealing station 11. This relationship is shown in Figure 5 wherein the slots cut by blades 85 and 86 are indicated at 85a and 86a.

As shown in Figure 5, the tear tape 18a preferably projects somewhat from the edge of the sheet which is nicked or slitted at 85a and 86a. The tear tape 18a also preferably extends the full width of sheet 8 though it may extend only partially across such sheet whenever it may be so desired, as in the case of producing wrappers which it may be necessary to tear only half-way across the wrapper sheet to open the package. If desired, a nicker or slitter may be disposed to provide similar slits 85a and 86a at the other edge of the sheet as well and the tear tape 18a may, if desired, project somwehat beyond the other edge whether or not the nicking is present at the point.

The machine of the present invention is a compact simple unit adapted to produce composite sheets in a continuous and rapid fashion. It is particularly advantageous as an attachment to packaging and wrapping machines with respect to which it may be disposed at the wrapper receiving end of such machines whereby to provide a continuous supply of wrapping material thereto which is produced concurrently with the packaging and/or wrapping operation. The disposition of the tear tape feeding and guiding mechanism at a lower-level of the machine and the provision of a guiding and feeding mechanism at an upper level of the machine for drawing the main sheet from a supply roll disposed at the end of the machine opposite to that at which the tear tape supply roll is supported makes it possible to provide a single transfer rotor system comprising the tape seizing and holding device and cutting element for drawing the cut tape from the cutting position immediately upwardly under the main sheet where the simultaneous rotation of the heated shoe effects an immediate sealing of the tape to the underside of the sheet while such sheet and tape pass continuously through the sealing position. The disposition of the heated shoe above the continuously traveling sheet 8 allows the dissipation of heat therefrom without heating up the elements thereof which act upon the tear strip material 18 during the feeding of such material to the cutting position. Similarly, the release of the suction shoe to the atmosphere causes a disturbance of the air therein which tends to cool the shoe and with the help of the rotation of the suction shoe through the cool air beneath the path of the sheet 8 through the upper level of the machine assures that the suction shoe for seizing the tape does not become so heated as to cause the tape 18a to become adhesive and stick to the surface of the shoe.

It is to be understood that changes and variations may be made without departing from the spirit and scope of the invention as defined in the appended claims.

We claim:

1. Apparatus for producing a composite sheet material comprising a frame, means at opposite ends of the frame for supporting roll supplies of sheet material, guide means carried by the frame at upper and lower levels, a stationary transverse cutting element positioned adjacent the discharge end of the lower-level guide means, sheet-delivering means between the lower-level guide means and one of the roll supply supporting means for drawing sheet material from said other roll supply and delivering it along the lower-level guide means to said cutting element, a rotary device having a member in its periphery for seizing a portion of the sheet material projecting past the cutting element, said rotary device carrying a cutting element adjacent said seizing member to cooperate with the stationary cutting element, means for continuously driving said rotary device, a rotor above the rotary device, a presser shoe on the rotor, means for heating the shoe, means for driving the rotor in synchronism with the rotary device to bring the shoe into registry with the seizing member to press and seal said portion of one sheet to the underside of the main sheet, and means driven in synchronism with the rotary device for nicking one edge of the main sheet as it proceeds to sealing position said nicking means comprising a pair of spaced blades mounted rotatably on an axis generally parallel to the direction of travel of the sheet, and means for rotating the blades downwardly through an edge of the sheet as it passes over the upper-level guide means, said upper level guide means having slots to permit the swinging of the blades therethrough.

2. Apparatus for producing a composite sheet material comprising a frame, means at opposite ends of the frame for supporting roll supplies of sheet material, guide means carried by the frame at an upper level to receive and discharge a main sheet from one of the roll supplies, guide means carried by the frame at a lower-level, a stationary transverse cutting element positioned adjacent the discharge end of the lower-level guide means, sheet-delivering means between the lower-level guide means and the other of the roll supply supporting means for drawing sheet material from said other roll supply and delivering it along the lower-level guide means to said cutting element, a rotary device disposed between the cutting element and the discharge end of the upper-level guide means and having a suction member in its periphery for seizing a portion of the sheet material projecting past the cutting element, said rotary device carrying a cutting element adjacent said seizing member to cooperate with the stationary cutting element to sever said projecting portion from the sheet passing along the lower-level guide means, means for continuously driving said rotary device, a rotor above the rotary device having a presser shoe thereon cooperating with said seizing member to form a nip therebetween during each revolution of the rotor and the rotary device on the rotor, means for heating the shoe, means for driving the rotor in synchronism with the rotary device to bring the shoe into registry with the seizing member at a position adjacent the discharge end of the upper-level guide means to press and seal said portion of one sheet to the underside of the main sheet, means for applying suction to the member when the rotary device is in position for cutting said projecting portion of the sheet, means for releasing the suction in the member when the member is at the nip thereof with the presser shoe, and means rotatable about an axis substantially parallel to the direction of travel of the main sheet and being driven in synchronism with the rotary device for nicking one edge of the main sheet as it proceeds to sealing position.

3. Apparatus as defined in claim 2 in which the nicking means comprises a pair of spaced blades mounted rotatably on said axis, and means for rotating the blades downwardly through an edge of the sheet as it passes over the upper-level guide means, said upper-level guide means having slots to permit the swinging of the blades therethrough.

References Cited in the file of this patent

UNITED STATES PATENTS

| | | |
|---|---|---|
| 2,265,609 | Milmoe et al. | Dec. 9, 1941 |
| 2,334,030 | Ranney et al. | Nov. 9, 1943 |
| 2,554,160 | Von Gunten | May 22, 1951 |
| 2,683,401 | Smith | July 13, 1954 |